Oct. 27, 1931.  N. H. CLOUGH  1,829,706

DAMPING CONTROL

Filed July 24, 1926

INVENTOR.
NEWSOME HENRY CLOUGH
BY Ira J. Adams
ATTORNEY

Patented Oct. 27, 1931

1,829,706

UNITED STATES PATENT OFFICE

NEWSOME HENRY CLOUGH, OF HANWELL, LONDON, ENGLAND, ASSIGNOR TO RADIO CORPORATION OF AMERICA, A CORPORATION OF DELAWARE

DAMPING CONTROL

Application filed July 24, 1926, Serial No. 124,763, and in Great Britain July 31, 1925.

This invention relates to means for controllably damping an oscillating circuit, more particularly of the type used in wireless telegraphy and telephony.

According to this invention the circuit to be damped is coupled to a second circuit, whose resistance inductance ratio is made high, and which "throws back" resistance into the first circuit so as to provide effective damping thereof, without causing an appreciable reduction in the inductance thereof.

A useful application of this principle is a circuit which is maintained in oscillation by a valve, and which has fixed tuning and reaction windings fixed in their relation to one another. The reaction winding is chosen so that the tuned circuit oscillates strongly until the damping winding is brought near, when the oscillations cease. The damping of the oscillatory circuit can thus be continuously varied from negative through zero to positive, by moving the damping winding.

The actual application of the damping circuit may be accomplished in various ways. For example, as applied to an ordinary inductance coil and condenser tuned receiving set, the damping resistance may be connected across the ends of an inductance coil variably coupled to the main or aerial tuning inductance coil.

When applied to a variometer tuned receiving set, the damping circuit may be coupled to a small extra winding in series with the variometer. It is, however, rather difficult to couple a coil directly to the main windings of a variometer, and for this reason it may be preferably to provide a link circuit comprising two inductance coils, one of which is fixedly coupled to the variometer (or to a small inductance in series therewith), and the other of which is variably coupled to the damping circuit. In this case the inductance of the winding coupled to the variometer should be small, relatively to that of the coil coupled to the damping circuit, since otherwise the inductance of the variometer would be considerably depressed irrespective of the value of the coupling to the damping circuit.

The damping winding may conveniently be formed of one or more turns of resistance wire, wound on a former so arranged that the electromagnetic coupling of the winding it carries to the circuit to be damped may be varied at will. If more turns than one are used, the ends of the coil may be interconnected, so as to form a single closed circuit, or each turn may be separately closed upon itself.

In another arrangement the damping circuit is constructed as a unit and consists of a split metallic ring, across the split of which is connected the damping resistance (which may conveniently be made interchangeable, if desired). This split ring construction has the advantage that it is self-supporting, no former being used; while the use of interchangeable resistance makes the unit readily adaptable to suit different or changing conditions.

The invention is illustrated in the accompanying drawings, in which

Figure 3:
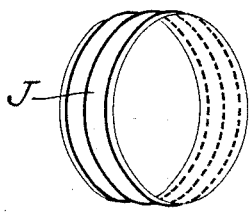
Figure 4:
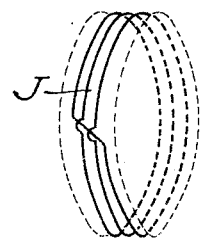
Figure 5:
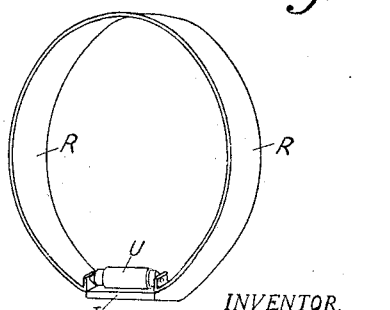

Figs. 3, 4, and 5 show diagrammatically three forms of damping windings.

Figure 1:
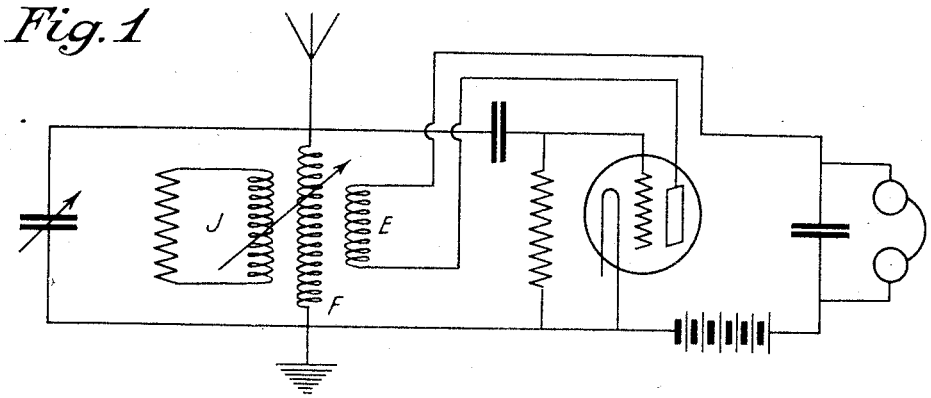
Fig. 1 is a diagram showing the invention as applied to a single valve radio receiver.

Referring now more particularly to Figure 1, E is the reaction coil which is fixedly coupled to a primary coil F. Variably coupled to the coil F is a damping unit J, comprising an inductance and effectively associated resistance, as shown. The remainder of the circuit of Figure 1 is that of a commonly employed form of thermionic valve radio receiver, filament heating means being omitted. Description of this is deemed unnecessary.

Figure 2:
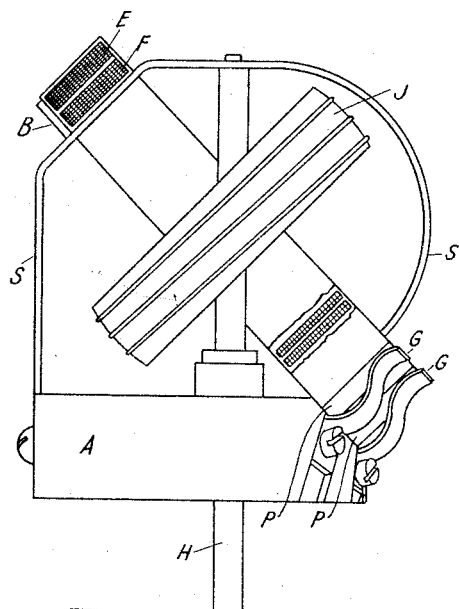
Fig. 2 shows one form of construction suitable for the application illustrated by Figure 1.

Referring to Figure 2, A is an insulating holder provided with a supporting frame S, upon which are detachably mounted concentric coils E and F, corresponding to the coils E, F, of Figure 1. The coils abut against a stop B upon the frame S and their ends are connected to external metal plates P, P, with which contact is made by springs, G, G, having terminals associated therewith, whereby the apparatus may be connected into an external circuit. H is a rotatable spindle mounted upon which is an insulated former, having a damping unit J wound thereon.

The whole arrangement is such that upon rotation of the spindle H, the unit J may be moved from the position in which the said unit is perpendicular to the plane of the coils E, F (as shown in the figure) to a position in which the said unit lies in the plane of the coils E, F; that is to say, from a position of minimum coupling to a position of maximum coupling.

The unit J may be formed in any convenient way, so long as its resistance-inductance ratio is high. Three convenient forms are shown diagrammatically in Figures 3, 4 and 5.

In the arrangement shown in Figure 3, the winding comprises three separate closed turns of resistance wire; in that shown in Figure 4 there is provided a three-turn closed helix of resistance wire, while in Figure 5 the unit takes the form of a split ring R whose ends are joined through a resistance U, preferably mounted upon an insulating base I.

By this invention a very large degree of damping may be obtained without a large change of inductance. Consider the case of a coil A, having inductance $L_1$ and resistance $R_1$, being damped by coupling with a coil B of inductance $L_2$ and resistance $R_2$.

Then, if K = coefficient of coupling, $$\delta_1 = \frac{R_1}{\omega L_1},$$

$\omega = 2\pi$ frequency, M= mutual inductance of the coils, and $$\delta_2 = \frac{R_2}{\omega L_2},$$

the effective inductance of the coil A will be altered to a value $L'_1$ where $$L'_1 = L_1 - \frac{M^2 \omega^2}{(R_2^2 + \omega^2 L_2^2)} L_2 = L_1\left(1 - \frac{K^2 \omega^2 L_2^2}{R_2^2 + \omega^2 L_2^2}\right) =$$

approximately $$L_1\left(1 - \frac{K^2}{\delta_2^2}\right),$$

when $R_2$ is large compared to $\omega L_2$.

Similarly the effective resistance of the coil will be altered to a value $R'_1$ where $$R'_1 = R_1 + \frac{M^2 \omega^2}{R_2^2 + \omega^2 L_2^2} R_2 =$$

(approximately)

$$R_1 + \frac{M^2 \omega^2}{R_2}$$

when $R_2$ is large compared to $\omega L_2$, $$= R_1 + \frac{K^2}{\delta_2^2} \omega L_1 \delta_2 = R_1\left[1 + \left(\frac{K^2}{\delta_2^2}\right)\left(\frac{\delta_2}{\delta_1}\right)\right],$$

i. e., the percentage change in $R_1$ equals $$\frac{\delta_2}{\delta_1} \times$$

percentage inductance change, the ratio $$\frac{\delta_2}{\delta_1}$$

being high.

Hence a large variation in $R'_1$ may be effected without a large variation in $L'_1$, by suitably selecting values of $L_2$ and $R_2$.

Having described my invention what I claim is:

1. Means for controlling damping in an oscillatory circuit without altering the resonant frequency thereof including an untuned closed damping circuit composed of an inductive coil of high resistance wire coupled to said oscillatory circuit.

2. Means for controlling damping in an oscillatory circuit without materially altering the resonant frequency thereof including a closed damping circuit composed of one or more turns of highly resistant wire variably coupled to said oscillatory circuit.

3. In radio apparatus, a vacuum tube having input and output circuits, fixed reactive coupling between said circuits adapted to produce sustained oscillation therein, and means including a closed inductance coil of high resistance wire coupled to one of said circuits and adapted to throw back resistance to said circuit to control the magnitude of the oscillations therein, without materially altering the impedance thereof.

4. In radio apparatus, a vacuum tube having input and output circuits, fixed reactive coupling between said circuits adapted to produce sustained oscillations therein, and means including an inductance consisting of a few turns of high resistance wire coupled to said input circuit for controlling the magnitude of the oscillations therein without materially altering the impedance thereof.

NEWSOME HENRY CLOUGH.